(12) United States Patent
Bao et al.

(10) Patent No.: US 10,320,606 B2
(45) Date of Patent: Jun. 11, 2019

(54) SERVER CONNECTION METHOD AND SYSTEM OF A NETWORK

(71) Applicant: Huawei Technologies Co., Ltd., Shenzhen (CN)

(72) Inventors: Wentao Bao, Beijing (CN); Binzhang Fu, Beijing (CN); Mingyu Chen, Beijing (CN); Lixin Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 619 days.

(21) Appl. No.: 15/014,184

(22) Filed: Feb. 3, 2016

(65) Prior Publication Data

US 2016/0173328 A1 Jun. 16, 2016

Related U.S. Application Data

(63) Continuation of application No. PCT/CN2014/084067, filed on Aug. 11, 2014.

(30) Foreign Application Priority Data

Aug. 9, 2013 (CN) .......................... 2013 1 0346756

(51) Int. Cl.
*H04L 12/751* (2013.01)
*H04L 12/24* (2006.01)
(Continued)

(52) U.S. Cl.
CPC .......... *H04L 41/0803* (2013.01); *H04L 12/42* (2013.01); *H04L 12/44* (2013.01);
(Continued)

(58) Field of Classification Search
CPC .. H04L 45/02; H04L 41/0803; H04L 41/0823
See application file for complete search history.

(56) References Cited

U.S. PATENT DOCUMENTS 5,125,076 A * 6/1992 Faber ................ G06F 15/17343
370/406
8,462,161 B1 * 6/2013 Barber .................. G06T 11/206
345/440
(Continued)

FOREIGN PATENT DOCUMENTS

CN           102006626 A      4/2011

OTHER PUBLICATIONS

Wikipedia definition of Hoffman-Singleton graph (Year: 2018).*
(Continued)

*Primary Examiner* — Jeong S Park
(74) *Attorney, Agent, or Firm* — Conley Rose, P.C.

(57) ABSTRACT

A server connection method and system, which relates to the field of communications technologies, such that servers of a same specification are used to implement an optimal network, thereby reducing complexity of routing implementation which includes, providing ten servers, where each server includes five nodes, and the five nodes of each server are connected head-to-tail in series in a same connection manner, and connecting five nodes of any server in five of the ten servers to five nodes of each of the remaining five servers in a one-to-one correspondence manner, in order to form an optimal network of a Hoffman-Singleton graph.

14 Claims, 6 Drawing Sheets

101 Provide ten servers, where each server includes five nodes, and the five nodes of each server are connected head-to-tail in series in a same connection manner 102 Connect five nodes of any server in five of the ten servers to five nodes of each of the remaining five servers in a one-to-one correspondence manner, so as to form an optimal network of a Hoffman-Singleton graph

(51) Int. Cl.
  *H04L 12/42* (2006.01)
  *H04L 12/44* (2006.01)
  *H04L 12/46* (2006.01)
  *H04L 12/26* (2006.01)

(52) U.S. Cl.
  CPC .......... *H04L 12/462* (2013.01); *H04L 41/142* (2013.01); *H04L 41/145* (2013.01); *H04L 43/045* (2013.01); *H04L 45/02* (2013.01); *H04L 41/0823* (2013.01)

(56) References Cited

U.S. PATENT DOCUMENTS

| | | | | |
|---|---|---|---|---|
| 2002/0049901 | A1* | 4/2002 | Carvey | H04L 49/251 713/153 |
| 2002/0051427 | A1* | 5/2002 | Carvey | H04L 49/251 370/254 |
| 2005/0169193 | A1 | 8/2005 | Black et al. | |
| 2010/0077101 | A1* | 3/2010 | Wang | H04L 67/104 709/238 |
| 2011/0161481 | A1* | 6/2011 | Brahme | H04L 45/00 709/223 |
| 2012/0179870 | A1* | 7/2012 | Wang | G06F 11/1076 711/114 |

OTHER PUBLICATIONS

Hafner, P., "On the Graphs of Hoffman-Singleton and Higman-Sims," The Electronic Journal of Combinatorics, vol. 11, No. 1, Retrieved from the Internet: URL: http://www.combinatorics.org/ojs/index.php/eljc/article/view/v11i1r77/pdf [retrieved on Sep. 21, 2016], Nov. 3, 2004, 33 pages.

Cohen, A., et al., "Segmented Information Dispersal (SID) for fault-tolerant video servers," XP000578588, Proceeding of High-Density Data Recordings and Retrieval Technologies, vol. 2604, Jan. 15, 1996, pp. 58-69.

Foreign Communication From a Counterpart Application, European Application No. 14834291.8, Extended European Search Report dated Oct. 5, 2016, 8 pages.

Machine Translation and Abstract of Chinese Publication No. CN102006626, dated Apr. 6, 2011, 6 pages.

Foreign Communication From a Counterpart Application, PCT Application No. 201310346756.7, Chinese Office Action dated Mar. 27, 2017, 5 pages.

Foreign Communication From a Counterpart Application, Japanese Application No. 2016-532231, Japanese Notice of Allowance dated Oct. 17, 2017, 3 pages.

Bao, W., et al., "A High-Performance and Cost-Efficient Interconnection Network for High-Density Servers," IEEE International Conference on High Performance COmputing and Communications & IEEE International Conference on Embedded and Ubiquitous Computing, Journal of Computer Science and Technology, vol. 29, No. 2, 2013, pp. 1246-1253.

Jaros, J., et al., "An Evolutionary Design Technique for Collective Communications on Optimal Diameter-Degree Networks," Proceedings of the 10th Annual Conference on Genetic and Evolutionary Computation, Jul. 16, 2008, pp. 1539-1546.

Foreign Communication From a Counterpart Application, PCT Application No. PCT/CN2014/084067, English Translation of International Search Report dated Nov. 18, 2014, 2 pages.

Foreign Communication From a Counterpart Application, PCT Application No. PCT/CN2014/084067, English Translation of Written Opinion dated Nov. 18, 2014, 5 pages.

* cited by examiner

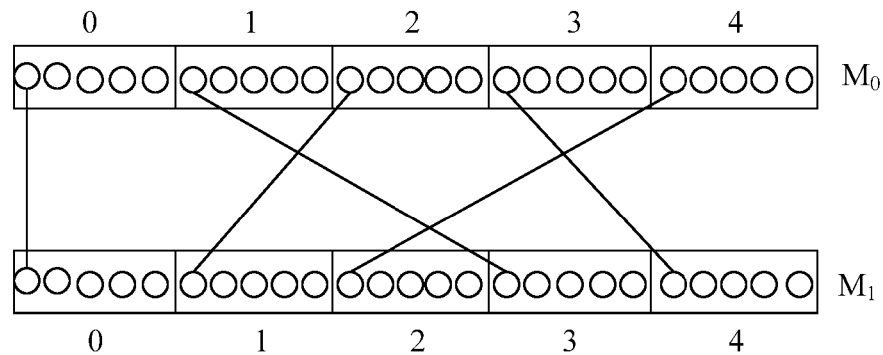

FIG. 7

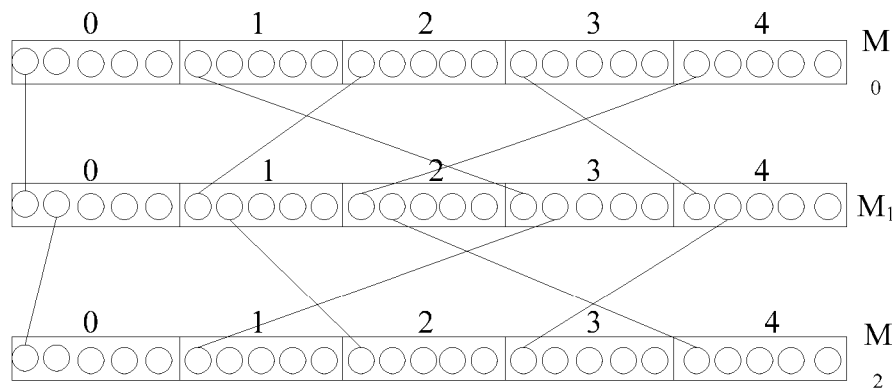

FIG. 8

| Provide five servers, where each server includes ten nodes, and the ten nodes of each server are connected to form a same Petersen graph; the Petersen graph includes: five nodes in an inner cycle and five nodes in an outer cycle; and the Petersen graph is a Moore graph whose diameter is 2 and whose node degree is 3 | 901 |

| Connect, in a one-to-one correspondence manner, five nodes that are of any server and are in an inner cycle to five nodes that are of each of the other servers and are in an outer cycle, so as to form an optimal network of a Hoffman-Singleton graph | 902 |

FIG. 9

SERVER CONNECTION METHOD AND SYSTEM OF A NETWORK

CROSS-REFERENCE TO RELATED APPLICATIONS

This application is a continuation of International Application No. PCT/CN2014/084067, filed on Aug. 11, 2014, which claims priority to Chinese Patent Application No. 201310346756.7, filed on Aug. 9, 2013, both of which are hereby incorporated by reference in their entireties.

TECHNICAL FIELD

The present disclosure relates to the field of communications technologies, and in particular, to a server connection method and system.

BACKGROUND

In an existing network topology architecture of a data center, the following topology construction solution is used: first, a cluster is constituted by multiple servers, and a network formed by the cluster is an optimal network; then, a switch is used to connect these clusters to meet a requirement of massive expansion. An optimal network used to constitute a cluster is a Hoffman-Singleton graph, which is a Moore graph whose diameter is 2 and has 50 nodes in total, where each node degree is 7, that is, a quantity of ports of each node is 7.

In the prior art, the 50 nodes are evenly divided into ten parts, and each part has five nodes, the ten parts are further divided into two groups, which are marked as group P and group Q, then, nodes in each of group P and group Q are connected according to a certain rule to complete construction of an entire optimal network. For five nodes of each part in group P, a pentagram connection manner is used, and for five nodes of each part in group Q, a ring connection manner is used.

Generally, five nodes in the foregoing each part are disposed in one server, and therefore, ten servers in total are needed to form an optimal network by means of connection. A connection manner of nodes in five servers is a pentagram connection manner, but a connection manner of nodes in the other five servers is a ring connection manner. The ten servers use two different specifications, and therefore, two sets of routing mechanisms need to be used in the servers, which increases complexity of routing implementation.

SUMMARY

Embodiments of the present disclosure provide a server connection method and system, so that servers of a same specification are used to implement an optimal network, thereby reducing complexity of routing implementation.

To achieve the foregoing objectives, the following technical solutions are used in the embodiments of the present disclosure:

According to a first aspect, the present disclosure provides a server connection method, including: providing ten servers, where each server includes five nodes, and the five nodes of each server are connected head-to-tail in series in a same connection manner, and connecting five nodes of any server in five of the ten servers to five nodes of each of the remaining five servers in a one-to-one correspondence manner, so as to form an optimal network of a Hoffman-Singleton graph.

According to the first aspect, in a first possible implementation manner, the connection manner is a ring connection manner.

With reference to the first aspect or the first possible implementation manner, in a second possible implementation manner, the connecting five nodes of any server in five of the ten servers to five nodes of each of the remaining five servers in a one-to-one correspondence manner, so as to form an optimal network of a Hoffman-Singleton graph includes: connecting, according to the following connection formula, a node x in a server whose number is j to a node y in a server whose number is k, where a value range of j is 1 to 9, a value range of k is 0 to 8, one of j and k is an odd number and the other one is an even number, and value ranges of x and y are 0 to 4; if j is an even number and k is an odd number, the connection formula is:

$$y = ((x + [j/2] \times [k/2]) \times 3) \bmod 5;\ \text{and}$$

if j is an odd number and k is an even number, the connection formula is:

$$y = (2 \times i - 6 \times [j/2] \times [k/2]) \bmod 5.$$

According to the second possible implementation manner, in a third possible implementation manner, the connecting five nodes of any server in five of the ten servers to five nodes of each of the remaining five servers in a one-to-one correspondence manner, so as to form an optimal network of a Hoffman-Singleton graph further includes: connecting, in the connection manner in ascending order of numbers of the servers, a current server whose number is j to a server whose number is k and which is before the current server whose number is j, until connection of the ten servers is completed.

According to a second aspect, the present disclosure provides a server connection method, including: providing five servers, where each server includes ten nodes, the ten nodes of each server are connected to form a same Petersen graph. The Petersen graph includes: five nodes in an inner cycle and five nodes in an outer cycle, and the Petersen graph is a Moore graph whose diameter is 2 and whose node degree is 3, and connecting, in a one-to-one correspondence manner, five nodes that are of any server and are in an inner cycle to five nodes that are of each of the other servers and are in an outer cycle, so as to form an optimal network of a Hoffman-Singleton graph.

According to the second aspect, in a first possible implementation manner, numbers of the five servers are 0 to 4 successively, among the ten nodes of each server, numbers i of the five nodes in the outer cycle are 0 to 4 successively, and numbers of the five nodes in the inner cycle are 5 to 9 successively, and a node whose number is i is connected to a node whose number is i+5, and the connecting, in a one-to-one correspondence manner, five nodes that are of any server and are in an inner cycle to five nodes that are of each of the other servers and are in an outer cycle, so as to form an optimal network of a Hoffman-Singleton graph includes: connecting, according to the following first connection formula, a node x that is in an outer cycle and is in a server whose number is j to a node y that is in an inner cycle and is in a server whose number is k, and connecting, according to the following second connection formula, a node x that is in an inner cycle and is in the server whose number is j to a node y that is in an outer cycle and is in the server whose number is k, where j>k; the first connection formula is:

$$y = (x + (j - k) \times k) \bmod 5 + 5;\ \text{and}$$

the second connection formula is:

$$y=(x-5-(k-j)\times j) \bmod 5.$$

According to the first possible implementation manner, in a second possible implementation manner, the connecting, in a one-to-one correspondence manner, five nodes that are of any server and are in an inner cycle to five nodes that are of each of the other servers and are in an outer cycle, so as to form an optimal network of a Hoffman-Singleton graph further includes: connecting a current server to all servers before the current server according to the first connection formula and the second connection formula in ascending order of numbers of the servers, until connection of the five servers is completed.

According to a third aspect, the present disclosure provides a system formed by means of connection on the basis of the server connection method according to the first aspect, including: an optimal network of a Hoffman-Singleton graph formed by connecting ten servers, where: each server includes five nodes, the five nodes of each server are connected head-to-tail in series in a same connection manner, and five nodes of any server in five of the ten servers are connected to five nodes of each of the remaining five servers in a one-to-one correspondence manner.

According to a fourth aspect, the present disclosure provides a system formed by means of connection on the basis of the server connection method according to the second aspect, including: an optimal network of a Hoffman-Singleton graph formed by connecting five servers, where: each server includes ten nodes, and the ten nodes of each server are connected to form a same Petersen graph. The Petersen graph includes: five nodes in an inner cycle and five nodes in an outer cycle. The Petersen graph is a Moore graph whose diameter is 2 and whose node degree is 3, and five nodes that are of any server and are in an inner cycle are connected, in a one-to-one correspondence manner, to five nodes that are of each of the other servers and are in an outer cycle, so as to form the optimal network of the Hoffman-Singleton graph.

According to the server connection method and system that are provided in the embodiments of the present disclosure, after renumbering is performed on servers in a certain mapping manner, it makes that internal connection and numbering manners of each server are the same, so that a uniform routing manner is used in each server, then, servers of a same specification are connected according to a certain rule, and an optimal network of a Hoffman-Singleton graph is finally formed, which reduces complexity of routing implementation.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

FIG. 7 is a schematic diagram of connecting a server $M_1$ with five nodes to a server $M_0$ with five nodes according to an embodiment of the present disclosure;

FIG. 8 is a schematic diagram of connecting a server $M_2$ with five nodes to a server $M_1$ with five nodes according to an embodiment of the present disclosure;

FIG. 9 is a schematic diagram of another server connection method according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
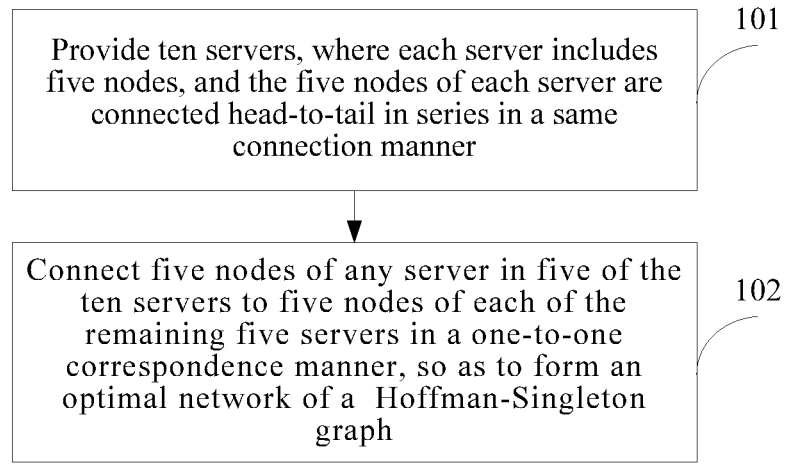
FIG. 1 is a schematic diagram of a server connection method according to an embodiment of the present disclosure.

The present disclosure provides a server connection method. As shown in FIG. 1, the method includes:

Step 101: Provide ten servers, where each server includes five nodes, and the five nodes of each server are connected head-to-tail in series in a same connection manner.

The ten provided servers are numbered from 0 to 9 successively.

Figure 2:
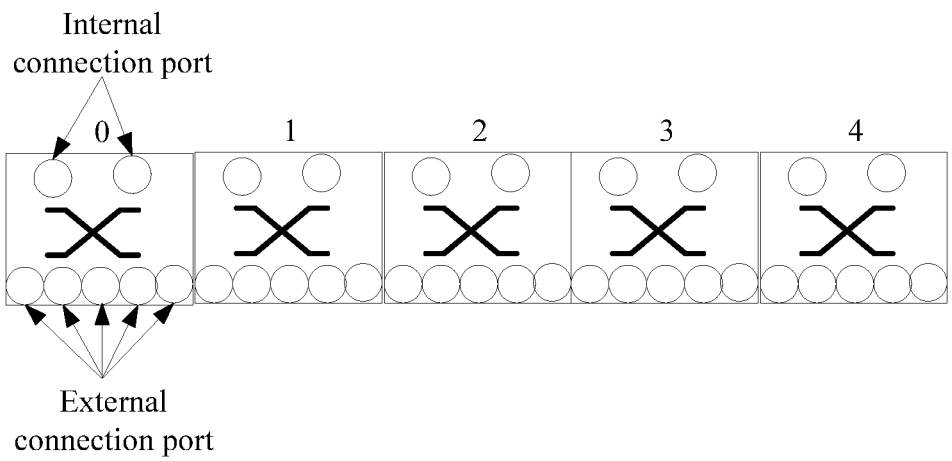
FIG. 2 is a schematic diagram of a server with five nodes according to an embodiment of the present disclosure.

That each server includes five nodes is that each server has five chips, that is, each chip is considered as a node, and the five nodes are numbered from 0 to 4 successively. Each node has seven ports, two ports of each node are used to connect five nodes in a server, and are referred to as internal connection ports herein, and the other five ports are used to connect servers, and are referred to as external connection ports herein. Therefore, each server includes 25 external connection ports in total, and as shown in FIG. 2, a circle indicates a port of each node.

Optionally, the ten provided servers are divided into two groups, which are marked as group P and group Q, and numbers of nodes x in a server are 0 to 4 successively. Servers in group P are numbered as $P_0$, $P_1$, $P_2$, $P_3$, and $P_4$ successively; and servers in group Q are numbered as $Q_0$, $Q_1$, $Q_2$, $Q_3$, and $Q_4$ successively.

Figure 3:
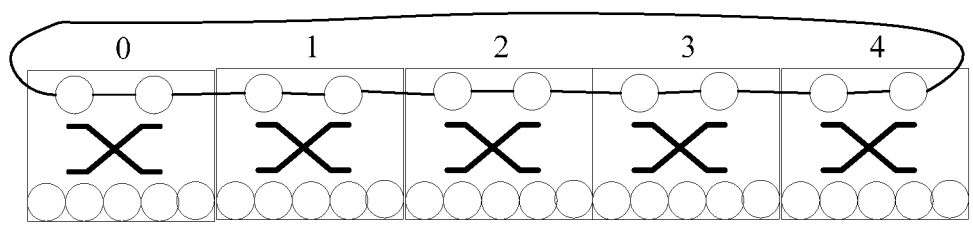
FIG. 3 is a schematic diagram of an internal connection manner of a server with five nodes according to an embodiment of the present disclosure.

Generally, connection of five nodes of each server in the ten provided servers is implemented in a manufacturing process. Therefore, if a connection manner of each server is a sequential ring connection manner, that the five nodes of each server are connected head-to-tail in series in a same connection manner using internal connection ports of each node in each server, connecting the five nodes of the server head-to-tail in series in the ring connection manner, as shown in FIG. 3.

Figure 4A:
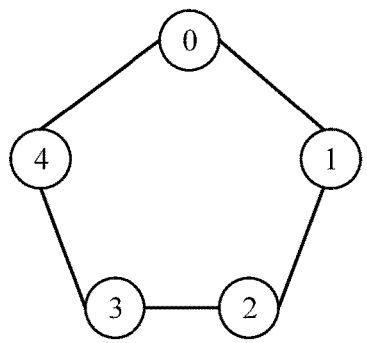
FIG. 4A and FIG. 4B are schematic diagrams of two different connection manners of nodes of a server with five nodes according to an embodiment of the present disclosure.
Figure 4B:
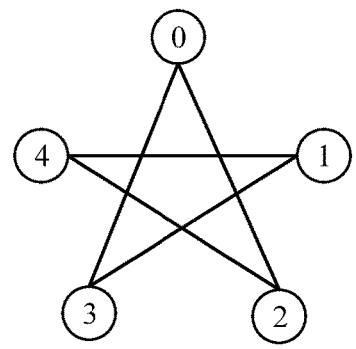

Furthermore, a server in the ten servers may use a sequential ring connection manner, as shown in FIG. 4A, or use a pentagram connection manner, as shown in FIG. 4B. If a server uses the pentagram connection manner, it is necessary to convert the pentagram connection manner into a sequential ring connection manner by performing renumbering in a certain mapping manner, which further includes the following:

First, a mutual connection manner of five nodes in a pentagram is kept unchanged, and the pentagram is unfolded to form a ring. Then, starting from a top vertex in a ring structure, numbering is successively performed clockwise in a first mapping manner.

Figure 5A:
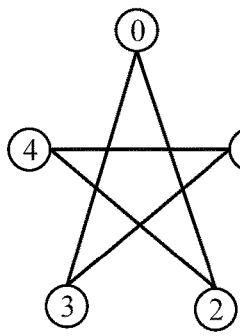
FIG. 5A, FIG. 5B and FIG. 5C are schematic diagrams of converting a pentagram connection manner of five nodes in a server into a ring connection manner according to an embodiment of the present disclosure.
Figure 5B:

The mutual connection manner of the five nodes is on the basis of a general vertex connection manner of a pentagram. As shown in FIG. 5A, a node 0 is mutually connected only to a node 2 and a node 3, a node 1 is mutually connected only to the node 3 and a node 4, the node 2 is mutual connected only to the node 0 and the node 4, the node 3 is mutually connected only to the node 0 and the node 1, and the node 4 is mutually connected only to the node 1 and the node 2. Therefore, the mutual connection manner of the five nodes may be obtained by using the foregoing mutual connection manner between nodes. If the node 0 is used as a start node, a connection sequence of the five nodes is 0-2-4-1-3-0, as shown in FIG. 5B.

Figure 5C:
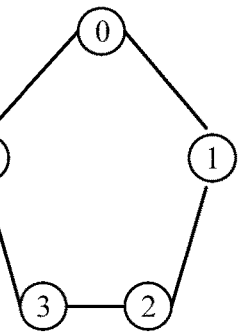

The first mapping manner is: using any node in a ring structure that is formed after the unfolding as a reference node, and performing a mod 5 calculation after a number of a reference node is subtracted from a number of each node in the ring structure, which may obtain that latest numbers of nodes in the current ring structure are 0-2-4-1-3-0 successively in a clockwise direction, where the reference node is used as a start node. Then, starting from the reference node and in the clockwise direction, performing renumbering on the latest numbers of the nodes by successively using mapping manners (0+5)mod 5, (2+4)mod 5, (4+3)mod 5, (1+2)mod 5, and (3+1)mod 5, so as to obtain a connection manner of 0-1-2-3-4-0. In this case, the ring structure is in a sequential connection manner, as shown in FIG. 5C.

Optionally, in step 101, if a connection manner of the servers in the group P is a pentagram connection manner, it is necessary to convert the pentagram connection manner of this group of servers into a sequential ring connection manner.

Because all servers in the group P use the pentagram connection manner, methods for changing connection manners of five servers in the group P are the same. Therefore, description is made in detail by using one server of the five servers as an example. First, a mutual connection manner of each node in the server is kept unchanged, and a pentagram is unfolded to form a ring; then, renumbering is performed in the foregoing first mapping manner to obtain the sequential ring connection manner.

If a node 0 is used as a reference node, numbers of nodes in a ring structure are 0-2-4-1-3 after a number of a reference node is subtracted. Afterward, a mod 5 calculation is performed to obtain that latest numbers of the nodes in the current ring structure are 0-2-4-1-3-0 successively. Then, starting from the reference node and in a clockwise direction, mapping manners (0+5)mod 5, (2+4)mod 5, (4+3)mod 5, (1+2)mod 5, and (3+1)mod 5 are successively used to perform renumbering on the latest numbers of the nodes to obtain a connection manner of 0-1-2-3-4-0. In this case, the ring structure is in a sequential connection manner.

If a node 2 is used as a reference node, numbers of nodes in a ring structure are 0-2-(−1)-1-(−2) after a number of a reference node is subtracted. Afterward, a mod 5 calculation is performed to obtain that latest numbers of the nodes in the current ring structure are 0-2-(−1)-1-(−2) successively. Then, starting from the reference node and in a clockwise direction, mapping manners (0+5)mod 5, (2+4)mod 5, ((−1)+3)mod 5, (1+2)mod 5, and ((−2)+1)mod 5 are successively used to perform renumbering on the latest numbers of the nodes to obtain a connection manner of 0-1-2-3-4-0. In this case, the ring structure is in a sequential connection manner.

If a node 4 is used as a reference node, numbers of nodes in a ring structure are 0-(−3)-(−1)-(−4)-(−2) after a number of a reference node is subtracted. Afterward, a mod 5 calculation is performed to obtain that latest numbers of the nodes in the current ring structure are 0-(−3)-(−1)-(−4)-(−2) successively. Then, starting from the reference node and in a clockwise direction, mapping manners (0+5)mod 5, ((−3)+4)mod 5, ((−1)+3)mod 5, ((−4)+2)mod 5, and ((−2)+1)mod 5 are successively used to perform renumbering on the latest numbers of the nodes to obtain a connection manner of 0-1-2-3-4-0. In this case, the ring structure is in a sequential connection manner.

If a node 1 is used as a reference node, numbers of nodes in a ring structure are 0-2-(−1)-1-3 after a number of a reference node is subtracted. Afterward, a mod 5 calculation is performed to obtain that latest numbers of the nodes in the current ring structure are 0-2-(−1)-1-3-0 successively. Then, starting from the reference node and in a clockwise direction, mapping manners (0+5)mod 5, (2+4)mod 5, ((−1)+3) mod 5, (1+2)mod 5, and (3+1)mod 5 are successively used to perform renumbering on the latest numbers of the nodes to obtain a connection manner of 0-1-2-3-4-0. In this case, the ring structure is in a sequential connection manner.

If a node 3 is used as a reference node, numbers of nodes in a ring structure are 0-(−3)-(−1)-1-(−2) after a number of a reference node is subtracted; afterward, a mod 5 calculation is performed to obtain that latest numbers of the nodes in the current ring structure are 0-(−3)-(−1)-1-(−2) successively. Then, starting from the reference node and in a clockwise direction, mapping manners (0+5)mod 5, ((−3)+4)mod 5, ((−1)+3)mod 5, (1+2)mod 5, and ((−2)+1)mod 5 are successively used to perform renumbering on the latest numbers of the nodes to obtain a connection manner of 0-1-2-3-4-0. In this case, the ring structure is in a sequential connection manner.

Step 102: Connect five nodes of any server in five of the ten servers to five nodes of each of the remaining five servers in a one-to-one correspondence manner, so as to form an optimal network of a Hoffman-Singleton graph.

Generally, connection of servers is implemented in a process, which is provided in step 101, of external connection of the servers.

Furthermore, five external connection ports of each node in five of the ten servers are connected to an external connection port of a node in the remaining five servers, and 25 external connection ports included in any server in the five of the ten servers are connected to 25 external connection ports included in each of the remaining five servers in a one-to-one correspondence manner, so as to form an optimal network of a Hoffman-Singleton graph.

The connection in a one-to-one correspondence manner may be: connecting, according to the following connection formula, a node x in a server whose number is j to a node y in a server whose number is k, where a value range of j is 1 to 9, a value range of k is 0 to 8, one of j and k is an odd number and the other one is an even number, and value ranges of x and y are 0 to 4; if j is an even number and k is an odd number, the connection formula is:

$$y=((x+[j/2]\times[k/2])\times3) \bmod 5; \text{ and}$$

if j is an odd number and k is an even number, the connection formula is:

$$y=(2\times i-6\times[j/2]\times[k/2]) \bmod 5.$$

It can be seen from the foregoing connection formulas that, when the number j of the server that needs to be connected is an odd number, the server whose number is an odd number is connected only to a server whose number is an even number, and when the number j of the server that needs to be connected is an even number, the server whose number is an even number is connected only to a server whose number is an odd number.

Preferably, a current server whose number is j is connected, according to the foregoing connection formulas in ascending order of numbers of the servers, to a server whose number is k and which is before the current server whose number is j, until connection of the ten servers is completed. That is, the ten servers may be added one by one according to the foregoing connection formulas, which is expanded to an optimal network of a Hoffman-Singleton graph without changing an original network topology.

Furthermore, when the servers are connected in ascending order of the numbers, the foregoing formulas may be simplified to obtain specific connection formulas in the following table 1, where M indicates a server, a subscript indicates a number of the server, and a value range of the subscript is 0 to 9; x indicates a number of a node of a newly added server, and y indicates a number of a node that is of a current server and needs to be connected to the node in the newly added server, where value ranges of x and y are 0 to 4, and (5 nodes→10 nodes) indicates that a current network has five nodes, and a quantity of nodes in the network increases from 5 to 10 after one server is added, and so on.

TABLE 1

| Newly added server | All current servers | Mutually connected server | Connection formula |
|---|---|---|---|
| $M_1$(5 nodes→10 nodes) | $M_0$ | $M_0$ | $y = (2*x) \bmod 5$ |
| $M_2$(10 nodes→15 nodes) | $M_0, M_1$ | $M_1$ | $y = (3*x) \bmod 5$ |
| $M_3$(15 nodes→20 nodes) | $M_0, M_1, M_2$ | $M_0$ | $y = (2*x) \bmod 5$ |
| | | $M_2$ | $y = (2*x + 4) \bmod 5$ |
| $M_4$(20 nodes→25 nodes) | $M_0, M_1, M_2, M_3$ | $M_1$ | $y = (3*x) \bmod 5$ |
| | | $M_3$ | $y = (3*x + 1) \bmod 5$ |
| $M_5$(25 nodes→30 nodes) | $M_0, M_1, M_2, M_3, M_4$ | $M_0$ | $y = (2*x) \bmod 5$ |
| | | $M_2$ | $y = (2*x + 3) \bmod 5$ |
| | | $M_4$ | $y = (2*x + 1) \bmod 5$ |
| $M_6$(30 nodes→35 nodes) | $M_0, M_1, M_2, M_3, M_4, M_5$ | $M_1$ | $y = (3*x) \bmod 5$ |
| | | $M_3$ | $y = (3*x + 4) \bmod 5$ |
| | | $M_5$ | $y = (3*x + 3) \bmod 5$ |

TABLE 1-continued

| Newly added server | All current servers | Mutually connected server | Connection formula |
|---|---|---|---|
| $M_7$(35 nodes→40 nodes) | $M_0, M_1, M_2, M_3, M_4, M_5, M_6$ | $M_0$ | $y = (2*x) \bmod 5$ |
| | | $M_2$ | $y = (2*x + 2) \bmod 5$ |
| | | $M_4$ | $y = (2*x + 4) \bmod 5$ |
| | | $M_6$ | $y = (2*x + 1) \bmod 5$ |
| $M_8$(40 nodes→45 nodes) | $M_0, M_1, M_2, M_3, M_4, M_5, M_6, M_7$ | $M_1$ | $y = (3*x) \bmod 5$ |
| | | $M_3$ | $y = (3*x + 2) \bmod 5$ |
| | | $M_5$ | $y = (3*x + 4) \bmod 5$ |
| | | $M_7$ | $y = (3*x + 1) \bmod 5$ |
| $M_9$(45 nodes→50 nodes) | $M_0, M_1, M_2, M_3, M_4, M_5, M_6, M_7, M_8$ | $M_0$ | $y = (2*x) \bmod 5$ |
| | | $M_2$ | $y = (2*x + 1) \bmod 5$ |
| | | $M_4$ | $y = (2*x + 2) \bmod 5$ |
| | | $M_6$ | $y = (2*x + 3) \bmod 5$ |
| | | $M_8$ | $y = (2*x + 4) \bmod 5$ |

Figure 6:
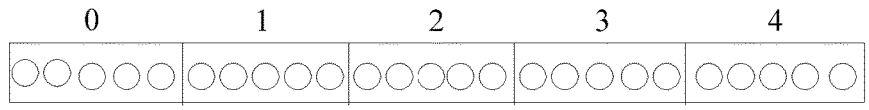
FIG. 6 is a schematic diagram of external connection ports of a server with five nodes according to an embodiment of the present disclosure.

Connection is performed in ascending order of numbers of servers according to table 1, and composition of each server is shown in FIG. 6, where internal connection lines of the server are hidden in FIG. 6, and only five ports for connecting servers are shown. Then, step 102 further includes the following steps:

(A1) When a server $M_1$ is added, all current servers are $M_0$, and the newly added server $M_1$ is connected to the server $M_0$ according to the connection formula $y=(2*x) \bmod 5$ provided in table 1.

Furthermore, when x=0, y=0, that is, a node 0 of the server $M_1$ is connected to a node 0 of the server $M_0$; when x=1, y=2, that is, a node 1 of the server $M_1$ is connected to a node 2 of the server $M_0$; when x=2, y=4, that is, a node 2 of the server $M_1$ is connected to a node 4 of the server $M_0$; when x=3, y=1, that is, a node 3 of the server $M_1$ is connected to a node 1 of the server $M_0$; and when x=4, y=3, that is, a node 4 of the server $M_1$ is connected to a node 3 of the server $M_0$. As shown in FIG. 7, a port is randomly selected from five nodes in each of the server $M_0$ and the server $M_1$ and is configured to connect the server $M_0$ and the server $M_1$.

In this case, the quantity of the nodes of the network increases from 5 to 10, and the server $M_0$ and the server $M_1$ are included.

(A2) When a server $M_2$ is added, all current servers are $M_0$ and $M_1$, and the newly added server $M_2$ is connected to the server $M_1$ according to the connection formula $y=(3*x) \bmod 5$ provided in table 1.

Furthermore, when x=0, y=0, that is, a node 0 of the server $M_2$ is connected to the node 0 of the server $M_1$; when x=1, y=3, that is, a node 1 of the server $M_2$ is connected to the node 3 of the server $M_1$; when x=2, y=1, that is, a node 2 of the server $M_2$ is connected to the node 1 of the server $M_1$; when x=3, y=4, that is, a node 3 of the server $M_2$ is connected to the node 4 of the server $M_1$; and when x=4, y=2, that is, a node 4 of the server $M_2$ is connected to the node 2 of the server $M_1$. As shown in FIG. 8, a port is randomly selected from ports that have not been connected and are in five nodes in each of the server $M_2$ and the server $M_1$ and is configured to connect the server $M_1$ and the server $M_2$.

In this case, the quantity of the nodes of the network increases from 10 to 15, and the server $M_0$, the server $M_1$, and the server $M_2$ are included.

(A3) When a server $M_3$ is added, all current servers are $M_0$, $M_1$, and $M_2$, and the newly added server $M_3$ is connected to the server $M_2$ according to the connection formula $y=(2*x+4) \bmod 5$ provided in table 1.

When the newly added server $M_3$ is connected to the server $M_0$ according to the connection formula y=(2*x)mod 5 provided in Table 1, furthermore, when x=0, y=0, that is, a node 0 of the server $M_3$ is connected to the node 0 of the server $M_0$; when x=1, y=2, that is, a node 1 of the server $M_3$ is connected to the node 2 of the server $M_0$; when x=2, y=4, that is, a node 2 of the server $M_3$ is connected to the node 4 of the server $M_0$; when x=3, y=1, that is, a node 3 of the server $M_3$ is connected to the node 1 of the server $M_0$; and when x=4, y=3, that is, a node 4 of the server $M_3$ is connected to the node 3 of the server $M_0$. A port is randomly selected from ports that have not been connected and are in five nodes in each of the server $M_3$ and the server $M_0$ and is configured to connect the server $M_3$ and the server $M_0$.

When the newly added server $M_3$ is connected to the server $M_2$ according to the connection formula y=(2*x+4) mod 5 provided in table 1, furthermore, when x=0, y=4, that is, the node 0 of the server $M_3$ is connected to the node 4 of the server $M_2$; when x=1, y=1, that is, the node 1 of the server $M_3$ is connected to the node 1 of the server $M_2$; when x=2, y=3, that is, the node 2 of the server $M_3$ is connected to the node 3 of the server $M_2$; when x=3, y=0, that is, the node 3 of the server $M_3$ is connected to the node 0 of the server $M_2$; and when x=4, y=2, that is, the node 4 of the server $M_3$ is connected to the node 2 of the server $M_2$. A port is randomly selected from ports that have not been connected and are in five nodes in each of the server $M_3$ and the server $M_2$ and is configured to connect the server $M_3$ and the server $M_2$.

In this case, the quantity of the nodes of the network increases from 15 to 20, and the server $M_0$, the server $M_1$, the server $M_2$, and the server $M_3$ are included.

(A4) A server $M_4$, a server $M_5$, a server $M_6$, a server $M_7$, a server $M_8$, and a server $M_9$ are successively connected one by one according to the connection formulas provided in table 1, until connection of the server $M_9$ is completed.

When connection of the ten servers is completed, a formed network is exactly an optimal network of a Hoffman-Singleton graph whose node degree is 7 and whose diameter is 2.

Optionally, the ten servers are evenly divided into two groups, where numbers j of servers in one group are 0 to 4, and numbers k of servers in the other group are 0 to 4.

A renumbered node number x is obtained after a second mapping manner is performed on a node in a server whose number is j, and a node whose node number is x is connected, according to the following connection formula, to a node y in a server whose number is k, and the connection formula is:

$$y=(x+j\times k)\bmod 5.$$

Furthermore, if the ten servers all use a ring connection manner, as shown in FIG. 4A, the ten servers are divided into two groups T and G, where numbers j of servers in the group T are 0 to 4 successively, and numbers k of servers in the group G are 0 to 4 successively.

The servers in the group T use a ring connection manner, and therefore, a second mapping manner is used to convert the ring connection manner of the servers in the group T into a pentagram connection manner. The second mapping manner is: using any node of any server in the group T as a reference node, and performing a mod 5 calculation after a number of a reference node is subtracted from a number of each node in a ring structure, which may obtain that latest numbers of nodes in the current ring structure are 0-1-2-3-4-0 successively in a clockwise direction, where the reference node is used as a start node. Then, starting from the reference node and in the clockwise direction, performing a mod 5 calculation after the latest numbers of the nodes are multiplied by 2, so as to obtain a connection manner of 0-2-4-1-3-0. In this case, the servers in the group T are in a pentagram connection manner.

Further, a node corresponding to a renumbered node number x in the group T after the second mapping manner is connected to a node y in the group G according to the following formula:

$$y=(x+j\times k)\bmod 5;\text{ and}$$

finally, an optimal network of a Hoffman-Singleton graph is formed.

Optionally, the ten servers are evenly divided into two groups, where numbers j of servers in one group are 0 to 4, and numbers k of servers in the other group are 0 to 4.

A renumbered node number x is obtained after a second mapping manner is performed on a node in a server whose number is j, and a node whose node number is x is connected, according to the following connection formula, to a node y in a server whose number is k, and the connection formula is:

$$y=(x+j\times k)\bmod 5.$$

Furthermore, if the ten servers all use a pentagram connection manner, as shown in FIG. 4B, the ten servers are divided into two groups T and G, where numbers j of servers in the group T are 0 to 4 successively, and numbers k of servers in the group G are 0 to 4 successively.

The servers in the group G use a pentagram connection manner, and therefore, a third mapping manner is used to convert the pentagram connection manner of the servers in the group T into a ring connection manner. The third mapping manner is: using any node of any server in the group G as a reference node, and performing a mod 5 calculation after a number of a reference node is subtracted from a number of each node in a ring structure, which may obtain that latest numbers of nodes in the current ring structure are 0-2-4-1-3-0 successively in a clockwise direction, where the reference node is used as a start node. Then, starting from the reference node and in the clockwise direction, performing a mod 5 calculation after the latest numbers of the nodes are multiplied by 3, so as to obtain a connection manner of 0-1-2-3-4-0. In this case, the servers in the group G are in a ring connection manner.

Further, a node corresponding to a node x in the group T is connected, according to the following formula, to a renumbered node y in the group G after the third mapping manner:

$$y=(x+j\times k)\bmod 5,\text{ and}$$

finally, an optimal network of a Hoffman-Singleton graph is formed.

According to the server connection method provided in this embodiment of the present disclosure, after renumbering is performed in a certain mapping manner, internal chips of each server are connected to form a ring with five nodes, and in this way, internal connection and numbering manners of each server are the same, so that each server has a same specification. Further, ten servers may be connected according to a certain connection formula, and an optimal network of a Hoffman-Singleton graph is formed, which reduces complexity of routing implementation.

The present disclosure provides another server connection method. As shown in FIG. 9, the method includes:

Step 901: Provide five servers, where each server includes ten nodes, and the ten nodes of each server are connected to form a same Petersen graph; the Petersen graph includes: five nodes in an inner cycle and five nodes in an outer cycle; and the Petersen graph is a Moore graph whose diameter is 2 and whose node degree is 3.

The five provided servers are numbered from 0 to 4 successively.

Figure 10:
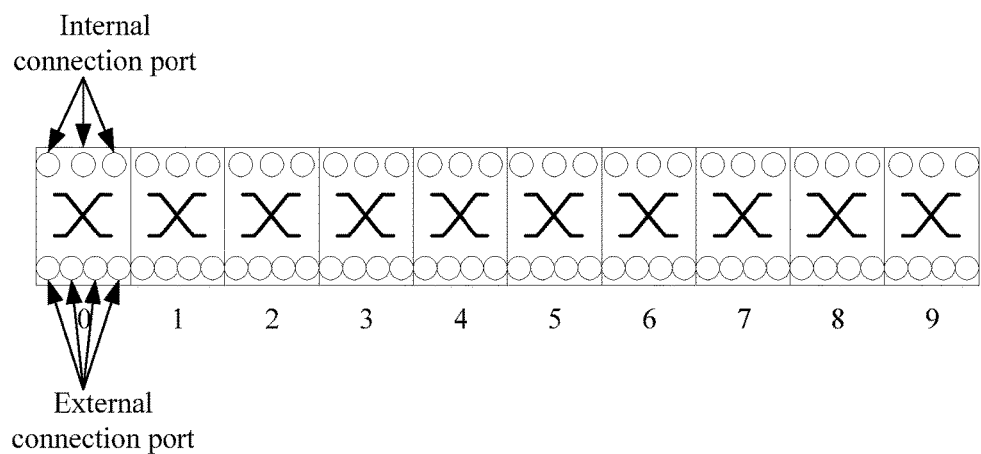
FIG. 10 is a schematic diagram of a server with ten nodes according to an embodiment of the present disclosure.

That each server includes ten nodes is that each server has ten chips, that is, each chip is considered as a node, and the ten nodes are numbered from 0 to 9 successively. Each node has seven ports. Three ports of each node are used to connect ten nodes in a server, and are referred to as internal connection ports herein, and the other four ports are used to connect servers, and are referred to as external connection ports herein. Therefore, each server includes 40 external connection ports in total, as shown in FIG. 10.

Figure 11:
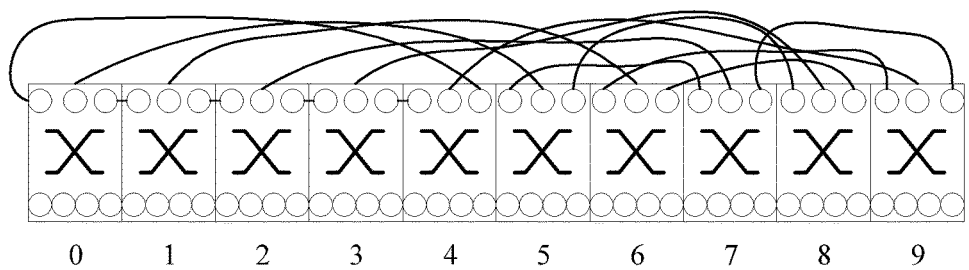
FIG. 11 is a schematic diagram of an internal connection manner of a server with ten nodes according to an embodiment of the present disclosure.

Generally, connection of ten nodes of each server in the five provided servers is implemented in a manufacturing process. Therefore, that the ten nodes of each server are connected to form a same Petersen graph using internal connection ports of each node in each server, connecting the ten nodes of the server to form the Petersen graph, as shown in FIG. 11.

A connection manner of former five nodes is: connecting three internal connection ports of a node 0 to an internal connection port of a node 4, an internal connection port of a node 5, and an internal connection port of a node 1 respectively from left to right, connecting three internal connection ports of the node 1 to an internal connection port of the node 0, an internal connection port of a node 6, and an internal connection port of a node 2 respectively from left to right, connecting three internal connection ports of the node 2 to an internal connection port of the node 1, an internal connection port of a node 7, and an internal connection port of a node 3 respectively from left to right, connecting three internal connection ports of the node 3 to an internal connection port of the node 2, an internal connection port of a node 8, and an internal connection port of the node 4 respectively from left to right, connecting three internal connection ports of the node 4 to an internal connection port of the node 3, an internal connection port of a node 9, and an internal connection port of the node 0 respectively from left to right.

A connection manner of latter five nodes is: connecting three internal connection ports of the node 5 to an internal connection port of the node 0, an internal connection port of the node 7, and an internal connection port of the node 8 respectively from left to right; connecting three internal connection ports of the node 6 to an internal connection port of the node 1, an internal connection port of the node 8, and an internal connection port of the node 9 respectively from left to right; connecting three internal connection ports of the node 7 to an internal connection port of the node 5, an internal connection port of the node 2, and an internal connection port of the node 9 respectively from left to right; connecting three internal connection ports of the node 8 to an internal connection port of the node 5, an internal connection port of the node 3, and an internal connection port of the node 6 respectively from left to right; connecting three internal connection ports of the node 9 to an internal connection port of the node 6, an internal connection port of the node 4, and an internal connection port of the node 7 respectively from left to right.

Furthermore, the Petersen graph formed by connecting the ten nodes in each server is obtained by combining five nodes in a pentagram connection manner in a server with five nodes in a ring connection manner in the server.

Optionally, nodes in group P and group Q are connected according to a certain formula to form a topology structure with 10 nodes, where the topology structure is a Petersen graph. A connection rule of the nodes in group P and group Q is as follows: each node x in $P_j$ is connected to a node y in $Q_k$, where the node y is obtained according to a formula $y=(x+j*k) \bmod 5$, x is a number of a node, where a value range of x is 0 to 4, j is a number of a server in the group P, where a value range of j is 0 to 4, and k is a number of a server in the group Q, where a value range of k is 0 to 4.

According to the foregoing connection formula, $R_0$ is formed by connecting $P_0$ and $Q_0$, $R_1$ is formed by connecting $P_1$ and $Q_1$, $R_2$ is formed by connecting $P_2$ and $Q_2$, $R_3$ is formed by connecting $P_3$ and $Q_3$, and $R_4$ is formed by connecting $P_4$ and $Q_4$. P is in an inner cycle, and Q is in an outer cycle.

Figure 12A:
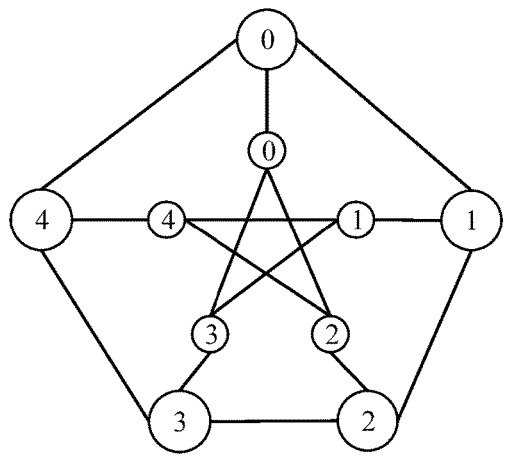
FIG. 12A, FIG. 12B and FIG. 12C are schematic diagrams of a Petersen graph formed by ten nodes according to an embodiment of the present disclosure.

Furthermore, each node x in $P_0$ is connected to a node y in $Q_0$ to form $R_0$, and then the connection formula $y=(x+j*k) \bmod 5=(x) \bmod 5$, in this case, a node 0 in $P_0$ is connected to a node 0 in $Q_0$, a node 1 in $P_0$ is connected to a node 1 in $Q_0$, a node 2 in $P_0$ is connected to a node 2 in $Q_0$, a node 3 in $P_0$ is connected to a node 3 in $Q_0$, and a node 4 in $P_0$ is connected to a node 4 in $Q_0$, as shown in FIG. 12A.

Figure 12B:
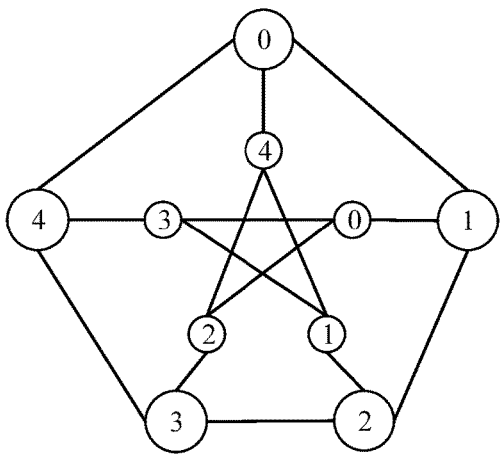

Each node x in $P_1$ is connected to a node y in $Q_1$ to form $R_1$, and then the connection formula $y=(x+j*k) \bmod 5=(x+1) \bmod 5$, in this case, a node 0 in $P_1$ is connected to a node 1 in $Q_1$, a node 1 in $P_1$ is connected to a node 2 in $Q_1$, a node 2 in $P_1$ is connected to a node 3 in $Q_1$, a node 3 in $P_1$ is connected to a node 4 in $Q_1$, and a node 4 in $P_1$ is connected to a node 0 in $Q_1$, as shown in FIG. 12B.

Figure 12C:
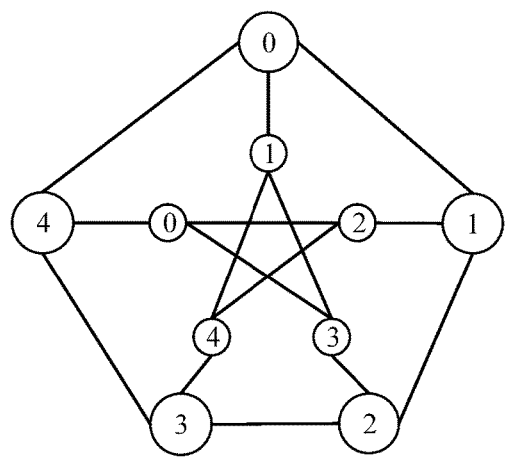

Each node x in $P_2$ is connected to a node y is $Q_2$ to form $R_2$, and then the connection formula $y=(x+j*k) \bmod 5=(x+4) \bmod 5$, in this case, a node 0 in $P_2$ is connected to a node 4 in $Q_2$, a node 1 in $P_2$ is connected to a node 0 in $Q_2$, a node 2 in $P_2$ is connected to a node 1 in $Q_2$, a node 3 in $P_2$ is connected to a node 2 in $Q_2$, and a node 4 in $P_2$ is connected to a node 3 in $Q_2$, as shown in FIG. 12C.

Each node x in $P_3$ is connected to a node y in $Q_3$, and then the connection formula $y=(x+j*k) \bmod 5=(x+9) \bmod 5=(x+4) \bmod 5$, in this case, a connection manner of $P_3$ and $Q_3$ is the same as the connection manner of $P_2$ and $Q_2$, as shown in FIG. 12C.

Each node x in $P_4$ is connected to a node y in $Q_4$, and then the connection formula $y=(x+j*k) \bmod 5=(x+16) \bmod 5=(x+1) \bmod 5$; in this case, a connection manner of $P_4$ and $Q_4$ is the same as the connection manner of $P_1$ and $Q_1$, as shown in FIG. 12B.

$R_0$ formed by connecting $P_0$ and $Q_0$ does not need to be changed, as shown in FIG. 12A.

$R_1$ formed by connecting $P_1$ and $Q_1$ is shown in FIG. 12B. To make connections between node pairs of $R_1$ be the same as those of $R_0$, numbers of nodes in $R_1$ need to be renumbered in a fourth mapping manner. The fourth mapping manner is: keeping numbers of nodes in an outer cycle unchanged, and changing five numbers of nodes in an inner cycle. In $R_1$ before changing, a node that is in the inner cycle and is connected to a node whose number is 0 and which is in the outer cycle is used as a reference node, and $(x+1) \bmod 5$ mapping is successively performed on numbers x of nodes in the inner cycle in a clockwise direction. In this case, a topology structure of renumbered $R_1$ is the same as that of $R_0$.

$R_2$ formed by connecting $P_2$ and $Q_2$ is shown in FIG. 12C. To make connections between node pairs of $R_2$ be the same as those of $R_0$, numbers of nodes in $R_2$ need to be renumbered in a fifth mapping manner. The fifth mapping manner is: keeping numbers of nodes in an outer cycle unchanged, and changing five numbers of nodes in an inner cycle. In $R_2$ before changing, a node that is in the inner cycle and is connected to a node whose number is 0 and which is in the outer cycle is used as a reference node, and (x+4)mod 5 mapping is successively performed on numbers x of nodes in the inner cycle in a clockwise direction. In this case, a topology structure of renumbered $R_2$ is the same as that of $R_0$.

After renumbering is performed in the foregoing mapping manners, internal chips in the five servers constitute a ten-node Petersen graph with a same structure, that is, a Moore graph whose diameter is 2 and whose node degree is 3, as shown in FIG. 12A.

Step 902: Connect, in a one-to-one correspondence manner, five nodes that are of any server and are in an inner cycle to five nodes that are of each of the other servers and are in an outer cycle, so as to form an optimal network of a Hoffman-Singleton graph.

Generally, connection of servers is implemented in a process, which is provided in step 901, of external connection of the servers.

Furthermore, a node x that is in an outer cycle and is in a server whose number is j may be connected, according to the following first connection formula, to a node y that is in an inner cycle and is in a server whose number is k, and a node x that is in an inner cycle and is in the server whose number is j is connected, according to the following second connection formula, to a node y that is in an outer cycle and is in the server whose number is k, where j>k; the first connection formula is:

$$y=(x+(j-k)\times k)\bmod 5+5;\text{ and}$$

the second connection formula is:

$$y=(x-5-(k-j)\times j)\bmod 5.$$

Further, a current server may be connected to all servers before the current server according to the first connection formula and the second connection formula in ascending order of numbers of the servers, until connection of the five servers is completed. That is, the five servers may be added one by one according to the foregoing first connection formula and second connection formula, which is expanded to an optimal network of a Hoffman-Singleton graph without changing an original network topology.

Furthermore, when the servers are connected in ascending order of the numbers, the foregoing first connection formula and second connection formula may be simplified to obtain specific connection formulas in the following table 2, where M indicates a server, a subscript indicates a number of the server, and a value range of the subscript is 0 to 4, x indicates a number of a node of a newly added server, and y indicates a number of a node that is of a current server and needs to be connected to the node in the newly added server, where value ranges of x and y are 0 to 9, former five nodes in the server (that is, nodes whose numbers are 0 to 4) are nodes in an outer cycle of $R_0$ shown in FIG. 12A, a node whose number is 0 in the outer cycle is used as a start node, and the former five nodes in the server are successively renumbered as 0, 1, 2, 3, and 4 in a clockwise direction. Latter five nodes (that is, nodes whose numbers are 5 to 9 in the server) are nodes in an inner cycle of $R_0$ shown in FIG. 12A, a node whose number is 0 is used as a start node, and the latter five nodes of the server are successively numbered as 5, 6, 7, 8, and 9 in a clockwise direction, and (10 nodes→20 nodes) indicates that a current network has ten nodes, a quantity of nodes in the network increases from 10 to 20 after one server is added, and so on.

TABLE 2

| Newly added server | All current servers | Mutually connected server | Connection formula |
|---|---|---|---|
| $M_1$(10 nodes→20 nodes) | $M_0$ | $M_0$ | Former five nodes: $y = x + 5$ Latter five nodes: $y = (x + 1)\bmod 5$ |
| $M_2$(20 nodes→30 nodes) | $M_0, M_1$ | $M_0$ | Former five nodes: $y = x + 5$ Latter five nodes: $y = (x + 4)\bmod 5$ |
| | | $M_1$ | Former five nodes: $y = 5 + (x + 1)\bmod 5$ Latter five nodes: $y = (x + 2)\bmod 5$ |
| $M_3$(30 nodes→40 nodes) | $M_0, M_1, M_2$ | $M_0$ | Former five nodes: $y = x + 5$ Latter five nodes: $y = (x + 4)\bmod 5$ |
| | | $M_1$ | Former five nodes: $y = 5 + (x + 2)\bmod 5$ Latter five nodes: $y = (x + 1)\bmod 5$ |
| | | $M_2$ | Former five nodes: $y = 5 + (x + 2)\bmod 5$ Latter five nodes: $y = (x + 3)\bmod 5$ |
| $M_4$(40 nodes→50 nodes) | $M_0, M_1, M_2, M_3$ | $M_0$ | Former five nodes: $y = x + 5$ Latter five nodes: $y = (x + 1)\bmod 5$ |
| | | $M_1$ | Former five nodes: $y = 5 + (x + 3)\bmod 5$ Latter five nodes: $y = (x + 2)\bmod 5$ |
| | | $M_2$ | Former five nodes: $y = 5 + (x + 4)\bmod 5$ Latter five nodes: $y = (x + 3)\bmod 5$ |
| | | $M_3$ | Former five nodes: $y = 5 + (x + 3)\bmod 5$ Latter five nodes: $y = (x + 4)\bmod 5$ |

Figure 13:
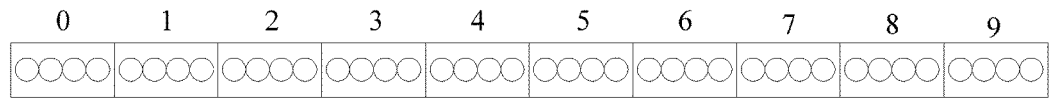
FIG. 13 is a schematic diagram of external connection ports of a server with ten nodes according to an embodiment of the present disclosure.
Figure 14:
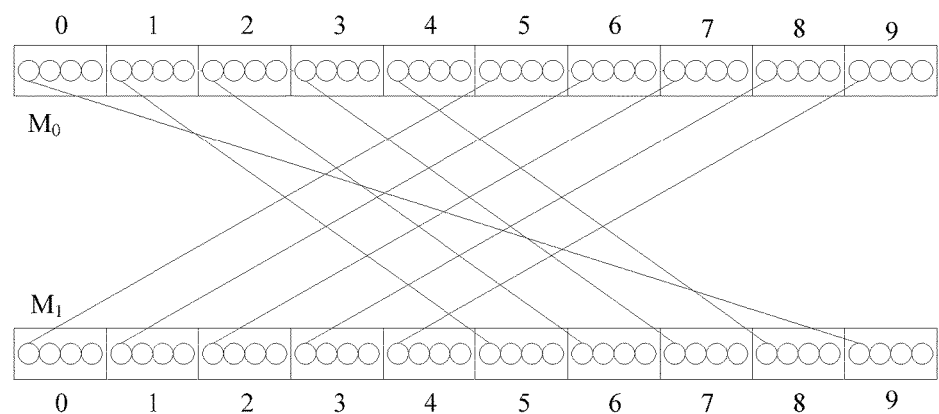
FIG. 14 is a schematic diagram of connecting a server $M_1$ with ten nodes to a server $M_0$ with ten nodes according to an embodiment of the present disclosure.

Connection is performed in ascending order of numbers of servers according to table 2, and composition of each server is shown in FIG. 13, where internal connection lines of the server are hidden in FIG. 13, and only four ports for connecting servers are shown. Then, step 902 further includes the following steps:

(B1) When a server $M_1$ is added, all current servers are $M_0$, and the newly added server $M_1$ is connected to the server $M_0$ according to the connection formula provided in table 2. Former five nodes of the server $M_1$ are connected to the server $M_0$ according to y=x+5, and latter five nodes of the server $M_1$ are connected to the server $M_0$ according to y=(x+1)mod 5, as shown in FIG. 14.

Furthermore, for the former five nodes of the server $M_1$, when x=0, y=5, that is, a node 0 of the server $M_1$ is connected to a node 5 of the server $M_0$; when x=1, y=6, that is, a node 1 of the server $M_1$ is connected to a node 6 of the server $M_0$; when x=2, y=7, that is, a node 2 of the server $M_1$ is connected to a node 7 of the server $M_0$; when x=3, y=8, that is, a node 3 of the server $M_1$ is connected to a node 8 of the server $M_0$; and when x=4, y=9, that is, a node 4 of the server $M_1$ is connected to a node 9 of the server $M_0$.

For the latter five nodes of the server $M_1$, when x=5, y=1, that is, a node 5 of the server $M_1$ is connected to a node 1 of the server $M_0$; when x=6, y=2, that is, a node 6 of the server $M_1$ is connected to a node 2 of the server $M_0$; when x=7, y=3, that is, a node 7 of the server $M_1$ is connected to a node 3 of the server $M_0$; when x=8, y=4, that is, a node 8 of the server $M_1$ is connected to a node 4 of the server $M_0$; and when x=9, y=0, that is, a node 9 of the server $M_1$ is connected to a node 0 of the server $M_0$.

In this case, the quantity of the nodes of the network increases from 10 to 20, and the server $M_0$ and the server $M_1$ are included.

(B2) When a server $M_2$ is added, all current servers are $M_0$ and $M_1$, and the newly added server $M_2$ is connected to the server $M_0$ and the server $M_1$ according to the connection formulas provided in table 2. Former five nodes of the server $M_2$ are connected to the server $M_0$ according to y=x+5, and latter five nodes of the server $M_2$ are connected to the server $M_0$ according to y=(x+4)mod 5, and the former five nodes of the server $M_2$ are connected to the server $M_1$ according to y=(x+1)mod 5+5, and the latter five nodes of the server $M_2$ are connected to the server $M_1$ according to y=(x+2)mod 5.

When the newly added server $M_2$ is connected to the server $M_0$, for the former five nodes of the server $M_2$, when x=0, y=5, that is, a node 0 of the server $M_2$ is connected to the node 5 of the server $M_0$; when x=1, y=6, that is, a node 1 of the server $M_2$ is connected to the node 6 of the server $M_0$; when x=2, y='7, that is, a node 2 of the server $M_2$ is connected to the node 7 of the server $M_0$; when x=3, y=8, that is, a node 3 of the server $M_2$ is connected to the node 8 of the server $M_0$; and when x=4, y=9, that is, a node 4 of the server $M_2$ is connected to the node 9 of the server $M_0$.

For the latter five nodes of the server $M_2$, when x=5, y=4, that is, a node 5 of the server $M_2$ is connected to the node 4 of the server $M_0$; when x=6, y=0, that is, a node 6 of the server $M_2$ is connected to the node 0 of the server $M_0$; when x=7, y=1, that is, a node 7 of the server $M_2$ is connected to the node 1 of the server $M_0$; when x=8, y=2, that is, a node 8 of the server $M_2$ is connected to the node 2 of the server $M_0$; and when x=9, y=3, that is, a node 9 of the server $M_2$ is connected to the node 3 of the server $M_0$.

When the newly added server $M_2$ is connected to the server $M_1$, for the former five nodes of the server $M_2$, when x=0, y=6, that is, the node 0 of the server $M_2$ is connected to the node 6 of the server $M_1$; when x=1, y=7, that is, the node 1 of the server $M_2$ is connected to the node 7 of the server $M_1$; when x=2, y=8, that is, the node 2 of the server $M_2$ is connected to the node 8 of the server $M_1$; when x=3, y=9, that is, the node 3 of the server $M_2$ is connected to the node 9 of the server $M_1$; and when x=4, y=5, that is, the node 4 of the server $M_2$ is connected to the node 5 of the server $M_1$.

For the latter five nodes of the server $M_2$, when x=5, y=2, that is, the node 5 of the server $M_2$ is connected to the node 2 of the server $M_1$; when x=6, y=3, that is, the node 6 of the server $M_2$ is connected to the node 3 of the server $M_1$; when x=7, y=4, that is, the node 7 of the server $M_2$ is connected to the node 4 of the server $M_1$; when x=8, y=0, that is, the node 8 of the server $M_2$ is connected to the node 0 of the server $M_1$; and when x=9, y=1, that is, the node 9 of the server $M_2$ is connected to the node 1 of the server $M_1$.

In this case, the quantity of the nodes of the network increases from 20 to 30, and the server $M_0$, the server $M_1$, and the server $M_2$ are included.

(B3) A server $M_3$ and a server $M_4$ are successively connected one by one according to the connection formulas provided in table 2, until connection of the server $M_4$ is completed.

When connection of the five servers is completed, a formed network is exactly an optimal network of a Hoffman-Singleton graph whose node degree is 7 and whose diameter is 2.

According to the server connection method provided in this embodiment of the present disclosure, after renumbering is performed in a certain mapping manner, internal chips of each server are connected to form a Petersen graph with ten nodes, and in this way, internal connection and numbering manners of each server are the same, so that each server has a same specification; further, five servers may be connected according to a certain connection formula, and an optimal network of a Hoffman-Singleton graph is formed, which reduces complexity of routing implementation.

An embodiment of the present disclosure provides a system formed by means of connection on the basis of the server connection method described in step 101 and step 102, where the system includes: an optimal network of a Hoffman-Singleton graph formed by connecting ten servers, where: each server includes five nodes, the five nodes of each server are connected head-to-tail in series in a same connection manner, and five nodes of any server in five of the ten servers are connected to five nodes of each of the remaining five servers in a one-to-one correspondence manner.

An embodiment of the present disclosure further provides a system formed by means of connection on the basis of the server connection method described in step 901 and step 902, where the system includes: an optimal network of a Hoffman-Singleton graph formed by connecting five servers, where: each server includes ten nodes, and the ten nodes of each server are connected to form a same Petersen graph. The Petersen graph includes: five nodes in an inner cycle and five nodes in an outer cycle. The Petersen graph is a Moore graph whose diameter is 2 and whose node degree is 3, and five nodes that are of any server and are in an inner cycle are connected, in a one-to-one correspondence manner, to five nodes that are of each of the other servers and are in an outer cycle, so as to form the optimal network of the Hoffman-Singleton graph.

According to the server connection system provided in this embodiment of the present disclosure, after renumbering is performed on servers in a certain mapping manner, it makes that internal connection and numbering manners of each server are the same, so that a uniform routing manner is used in each server, then, servers of a same specification are connected according to a certain rule, and an optimal network of a Hoffman-Singleton graph is finally formed, which reduces complexity of routing implementation.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The foregoing software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A server connection method, comprising:
providing a plurality of servers, each server comprising five nodes, each node of the five nodes comprising two internal connection ports and five external connection ports;
coupling head-to-tail in series, with a processor based on a first network topology, a first five nodes of a selected server using the internal connection ports;
mapping and converting, with the processor, a second network topology of a server of a second five servers to the first network topology when the second network topology differs from the first network topology; and
coupling, with the processor based on the first network topology, the first five nodes of the selected server of a first five servers to second five nodes of each of the second five servers using the external connection ports to provide a Hoffman-Singleton graph with the first network topology that reduces complexity of routing information through the servers.

2. The server connection method of claim 1, wherein the head-to-tail coupling is a ring connection topology.

3. The server connection method of claim 2, wherein the servers comprises ten servers, coupling the first five nodes of the selected server to the second five nodes of each of the second five servers to provide the Hoffman-Singleton graph with the first network topology comprising coupling a node x in the selected server whose number is j to another node y in another server whose number is k, a value range of j being one to nine, a value range of k being zero to eight, one of j and k being an odd number and an even number, value ranges of x and y being zero to four according to a connection formula y, the connection formula y being $y=((x+[j/2]\times[k/2])\times3) \bmod 5$ when j is the even number and k is the odd number, and the connection formula y being $y=(2\times i-6\times[j/2]\times[k/2]) \bmod 5$ when j is the odd number and k is the even number.

4. The server connection method of claim 3, wherein coupling the first five nodes of the selected server to the second five nodes of each of the second five servers to provide the Hoffman-Singleton graph with the first network topology further comprises coupling, in a connection manner in ascending order of numbers of the plurality of servers, a current server whose number is j to another server whose number is k and which is before the current server whose number is j until connection of ten servers is completed.

5. A server connection method, comprising:
providing a plurality of servers, each server comprising ten nodes, each node of the ten nodes comprising three internal connection ports and four external connection ports, the ten nodes of the each server being coupled in a first network topology using the internal connection ports to form a same Petersen graph, the Petersen graph comprising five nodes in an inner cycle and five nodes in an outer cycle, the Petersen graph being a Moore graph with a diameter of two and a node degree of three;
mapping and converting, with a processor, a second network topology of a server in the servers to the first network topology when the second network topology differs from the first network topology; and
coupling, with the processor based on the first network topology, a first five nodes in an inner cycle of a selected server to second five nodes in an outer cycle of the other servers using the external connection ports to provide a network of a Hoffman-Singleton graph comprising the first network topology that reduces complexity of routing information through the servers.

6. The server connection method of claim 5, wherein the servers comprise five servers, numbers of the five servers being zero to four successively, among the ten nodes of the each server, numbers i of the five nodes in the outer cycle being zero to four successively, and numbers of the five nodes in the inner cycle being five to nine successively, a node i being coupled to a node i+5, and coupling the first five nodes in the inner cycle of the selected server to the second five nodes in the outer cycle to provide the network of the Hoffman-Singleton graph with the first network topology comprising:
coupling, a node x in the outer cycle in a first server whose number is j to a node y in the inner cycle of a second server whose number is k, according to a first connection formula, $y=(x+(j-k)\times k) \bmod 5+5$, $j>k$; and
coupling, a node x in the inner cycle in the first server whose number is j to a node y in the outer cycle of the second server whose number is k, according to a second connection formula, $y=(x-5-(k-j)\times j) \bmod 5$, and $j>k$.

7. The server connection method of claim 6, wherein coupling, the first five nodes in the inner cycle of the selected server to the second five nodes in the outer cycle of the each server further comprises coupling, a current server to all servers before the current server according to the first connection formula and the second connection formula in ascending order of numbers of the servers, until connection of the five servers is completed.

8. A system for a server connection, comprising:
a processor; and
a plurality of servers that are configured to be coupled together in a network of a Hoffman-Singleton graph using the processor, each server comprising five nodes, each node of the five nodes comprising two internal connection ports and five external connection ports, the processor being configured to:
couple head-to-tail in series, in a first network topology, a first five nodes of a selected server using the internal connection ports;

map and convert a second network topology of a server in a second five servers to the first network topology when the second network topology differs from the first network topology; and couple the first five nodes of the selected server of a first five servers to second five nodes of each of the second five servers using the external connection ports to provide the Hoffman-Singleton graph with the first network topology that reduces complexity of routing information through the servers.

9. The system of claim 8, wherein the head-to-tail coupling is a ring connection topology.

10. The system of claim 9, wherein the servers comprises ten servers, the processor being further configured to couple a node x in the selected server whose number is j to another node y in another server whose number is k, a value range of j being one to nine, a value range of k being zero to eight, wherein one of j and k being an odd number and an even number, value ranges of x and y being zero to four, according to a connection formula, the connection formula being $y=((x+[j/2]\times[k/2])\times 3) \bmod 5$ when j is the even number and k is the odd number, and the connection formula being $y=(2\times i-6\times[j/2]\times[k/2]) \bmod 5$ when j is the odd number and k is the even number.

11. The system of claim 10, wherein the processor is further configured to couple, in a connection manner in ascending order of numbers of the servers, a current server whose number is j to another server whose number is k and which is before the current server whose number is j, until connection of the ten servers is completed.

12. A system for a server connection, comprising:
a processor; and
a plurality of servers that are configured to be coupled together in a network of a Hoffman-Singleton graph using the processor, each server comprising ten nodes, each node of the ten nodes comprising three internal connection ports and four external connection ports, the processor being configured to:
couple ten nodes of the each server in a first network topology using the internal connection ports to form a same Petersen graph, the Petersen graph comprising five nodes in an inner cycle and five nodes in an outer cycle, the Petersen graph being a Moore graph with a diameter of two and a node degree of three;

map and convert a second network topology of a server in the servers to the first network topology when the second network topology differs from the first network topology; and couple a first five nodes in an inner cycle of a selected server to second five nodes in an outer cycle of the other servers using the external connection ports to provide the Hoffman-Singleton graph comprising the first network topology that reduces complexity of routing information through the servers.

13. The system of claim 12, wherein the servers comprise five servers, numbers of the five servers being zero to four successively, among the ten nodes of the each server, numbers i of the five nodes in the outer cycle being zero to four successively, and numbers of the five nodes in the inner cycle being five to nine successively, a node whose number is i being coupled to a node i+5, and the processor is further configured to:

couple, a node x in the outer cycle that is in a first server whose number is j to a node y in the inner cycle that is in a second server whose number is k, according to a first connection formula, $y=(x+(j-k)\times k) \bmod 5+5$, wherein $j>k$; and couple, a node x in the inner cycle that is in the first server whose number is j to a node y in the outer cycle that is in the second server whose number is k, according to a second connection formula, $y=(x-5-(k-j)\times j) \bmod 5$, wherein $j>k$.

14. The system of claim 13, wherein the processor is further configured to couple, a current server to all servers before the current server according to the first connection formula and the second connection formula in ascending order of numbers of the servers, until connection of the five servers is completed.

* * * * *